UNITED STATES PATENT OFFICE.

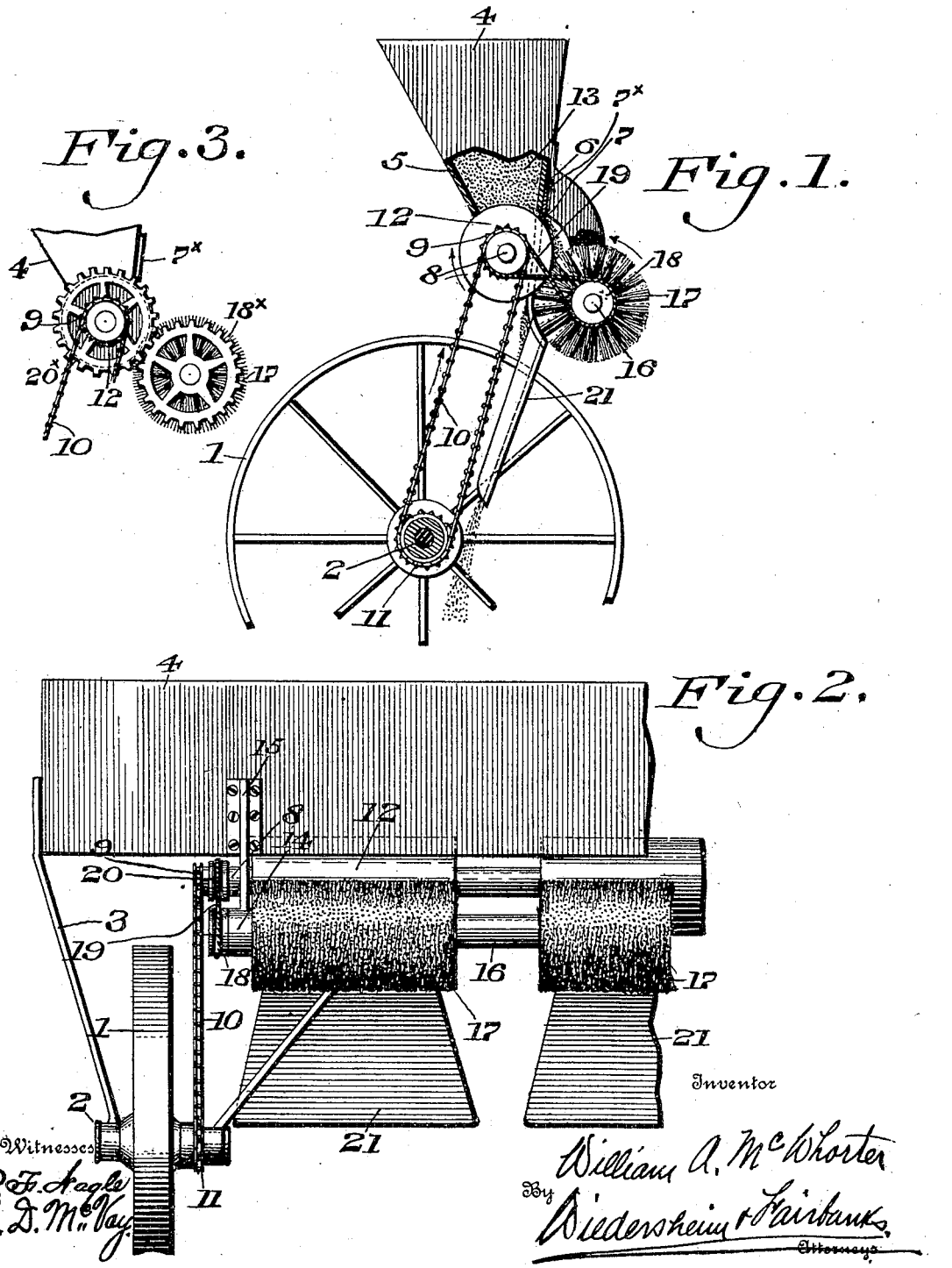

WILLIAM A. McWHORTER, OF NORFOLK, VIRGINIA, ASSIGNOR TO McWHORTER MANUFACTURING COMPANY, A CORPORATION OF NEW JERSEY.

DISTRIBUTER OR DUSTER.

No. 838,267.     Specification of Letters Patent.     Patented Dec. 11, 1906.

Application filed October 9, 1906. Serial No. 338,148.

*To all whom it may concern:*

Be it known that I, WILLIAM A. McWHORTER, a citizen of the United States, residing at Norfolk, in the county of Norfolk, State of Virginia, have invented a new and useful Distributer or Duster, of which the following is a specification.

My invention relates to a new and useful improvement in a device adapted for distributing or dusting paris-green or other insect-destroying material on vines, plants, &c.; and it consists in providing a device with a feed whereby the proper amount of the material will be directed to the place of service.

It further consists of other novel details of construction, all as will be hereinafter fully set forth.

Figure 1 represents a partial side elevation and partial sectional view of a portion of a distributer embodying my invention. Fig. 2 represents a front elevation of a portion of my device. Fig. 3 represents a view of a modification of a detached portion.

Similar numerals of reference indicate corresponding parts in the figures.

Referring to the drawings, in distributing or dusting machines I have found in practice that it is desirable that the material to be distributed should be applied continuously as the machine is moved and that a regular and even amount of material be fed in order that the best results may be obtained. For example, in the distribution of paris-green upon potato-vines it is necessary that the material be properly fed in order to accompish the results. In my device the farmer can safely and in the most rapid and easy manner destroy the potato-bugs by an even distribution of the material, it being applied to the leaves of the vines as the machine is propelled in any desired manner.

To the above ends I have shown one form for carrying out my invention; but it is understood that other instrumentalities may be employed for accomplishing the same results.

1 designates the traveling wheel of the distributer, it being understood that there is a similar wheel on the opposite side of the machine, said wheel being carried upon a suitable axle 2. Supported by said axle is a frame or other suitable support 3, which carries the hopper 4, it being understood that at the opposite end the hopper is supported in a similar manner and that the front and rear walls 5 and 6 of this hopper are inclined toward each other and that at proper intervals the bottom of the hopper has outlets 7 for the same, said outlets being provided with adjusting-gates $7^\times$, as shown in Fig. 1, the same for purpose of clearness being removed from Fig. 2.

8 designates a shaft suitably supported adjacent the lower portion of the hopper and one end of which is preferably provided with a sprocket-wheel 9, around which passes a chain 10, which also passes around a sprocket-wheel 11 on the axle 2, by which means it will be seen that as the device is propelled the sprocket-wheel 11 is rotated, operating the chain 10 and also the sprocket-wheel 9, which thus rotates the shaft 8 for purposes hereinafter described.

12 designates rollers carried by the shaft 8, which are so situated at the bottom of the hopper 4 that the material 13—for example, paris-green in powder form—cannot escape from the openings until the device is properly operated.

16 designates a second shaft which is suitably supported adjacent the first-mentioned shaft 8, in the present instance by a collar 14, carried by a bracket 15, supported by the hopper 4, said shaft 16 carrying the brushes 17 at intervals thereon, which are so arranged as to be situated adjacent the rollers 12 and to contact therewith.

18 designates a pulley on the shaft 16, around which passes the endless belt 19, which also passes around the pulley 20, carried by the shaft 8, so that when the shaft 8 is rotated the pulley will impart proper motion to the shaft 16, and thus to the brushes 17, it being noted that the rollers 12 and brushes 17 will be rotated in an opposite direction to each other.

21 designates a spout or chute which is situated substantially below the brushes 17 and in such a position with respect to the brushes 17 that as the material is released by the brushes from the rollers 12 it will be directed into the spout or guide 21 and be distributed upon the vines or other places desired. It will be understood that the spouts are the same in number as the rollers and brushes and that the same may be supplied with any desired means for properly distributing the material.

The operation of the device will be readily apparent: The hopper 4 is provided with the material in powder form and the machine guided with respect to the vines, plants, &c., to be dusted. As the machine is propelled and the wheels rotate motion is imparted to the shafts 8 and 16, thus rotating the rollers 12 and brushes 17, it being seen that a certain amount of the material 13 will adhere to the face 12 of the roller in its rotation, from which it will be detached by the brushes 17 and be directed into the chutes 21 for proper distribution or dusting. Any desired number of rollers, brushes, and chutes may be employed, although I preferably desire to use four in number in order that the machine in its operation will supply four rows. The chain 19 may be dispensed with, and in lieu thereof I may employ the pinions $18^\times$ and $20^\times$, (shown in Fig. 3,) the same being geared together and secured to properly rotate the brushes the same as in Fig. 1.

Having thus described my invention, what I claim as new, and desire to secure by Letters Patent, is—

1. In a distributer or duster, a hopper having an opening, a roller adapted to control said opening, a brush situated adjacent said roller for removing the material therefrom, and means for operating said roller and brush for feeding the material.

2. In a distributer or duster, a hopper having a suitable discharge-opening, a roller situated in said opening and normally controlling the same, means for rotating said roller upon the face of which latter some of the material is carried, a brush for removing the material from said roller, and means operated by the movement of the distributer for rotating said brush.

3. In a distributer or duster, a hopper having openings at intervals in its lower face, a roller situated in each of said openings, a brush situated adjacent each of said rollers, means for rotating said rollers and said brushes and a guide adapted to receive the material from the rollers when removed therefrom by said brushes.

WILLIAM A. McWHORTER.

Witnesses:
EDWARD SPALDING,
MAUDE SWARTZ.